United States Patent [19]
Ichikawa et al.

[11] Patent Number: 6,134,372
[45] Date of Patent: Oct. 17, 2000

[54] LIGHT INTENSITY ATTENUATOR AND ATTENUATING METHOD

[75] Inventors: Junichiro Ichikawa; Hirotoshi Nagata; Kaoru Higuma; Junichiro Minowa, all of Funabashi; Takaaki Ogata; Yasuhisa Taneda, both of Tokyo, all of Japan

[73] Assignees: Sumitomo Osaka Cement Co., Ltd.; NEC Corporation, both of Tokyo, Japan

[21] Appl. No.: 09/319,068

[22] PCT Filed: Sep. 20, 1998

[86] PCT No.: PCT/JP98/04346

§ 371 Date: Jun. 1, 1999

§ 102(e) Date: Jun. 1, 1999

[87] PCT Pub. No.: WO99/17472

PCT Pub. Date: Apr. 8, 1999

[30] Foreign Application Priority Data

Oct. 1, 1997 [JP] Japan .................................... 9-268916
Mar. 26, 1998 [JP] Japan .................................. 10-079345

[51] Int. Cl.[7] ............................ G02B 6/122; G02F 1/37
[52] U.S. Cl. ......................... 385/140; 385/32; 385/122; 359/332
[58] Field of Search ............................... 385/4–5, 15, 27, 385/31–34, 39, 42, 48, 50, 129, 130, 132, 140

[56] References Cited

U.S. PATENT DOCUMENTS

| | | | |
|---|---|---|---|
| 4,188,126 | 2/1980 | Boisde et al. | 356/440 |
| 5,005,938 | 4/1991 | Itoh et al. | 359/326 |
| 5,526,449 | 6/1996 | Meade et al. | 385/14 |
| 5,537,244 | 7/1996 | Fukushima et al. | 359/341 |

FOREIGN PATENT DOCUMENTS

| | | |
|---|---|---|
| 0 445 984 | 9/1991 | European Pat. Off. . |
| 691 26 155 | 12/1997 | Germany . |
| 4-104232 | 4/1992 | Japan . |
| 6-216452 | 8/1994 | Japan . |
| 8-18138 | 1/1996 | Japan . |
| 9-146056 | 6/1997 | Japan . |
| 9-297286 | 11/1997 | Japan . |

OTHER PUBLICATIONS

Fluck et al., "Cerenkov–Type Second–Harmonic Generation in KNbO3 Channel Waveguides", IEEE Journal of Quantum Electronics, vol. 32, No. 6, Jun. 1996, pp. 905–916.

(List continued on next page.)

*Primary Examiner*—John D. Lee
*Assistant Examiner*—Michael R. Connelly-Cushwa
*Attorney, Agent, or Firm*—Sughrue, Mion, Zinn, Macpeak & Seas, PLLC

[57] ABSTRACT

A light intensity attenuator and attenuating method is provided, by which a pulse-shaped optical surge can be attenuated and an optical signal component using desired light intensity can be output by using a simpler structural arrangement, and without using many optical components and circuits. In this method, an optical signal including a pulse-shaped optical surge component is received, and the optical signal is again output after the light intensity of the surge component is attenuated by a desired amount. Typically, (i) at least one of a substrate and an optical waveguide formed on the substrate is made of a material producing a nonlinear optical effect, and the refractive index of the optical waveguide with respect to the optical signal is smaller than the refractive index of the substrate with respect to a higher harmonic of the optical signal, thereby wavelength-converting a part of the input optical signal by the nonlinear optical effect into a light portion having a wavelength shorter than that of the optical signal, and scattering this converted portion, and (ii) a part of the optical signal is scattered by using a polar-molecule liquid including polar molecules.

14 Claims, 11 Drawing Sheets

OTHER PUBLICATIONS

H.M. Chen et al., "Experimental determination of the effect of polarization of the heating laser pulse on the characteristic decay time constant and focal length of thermal lenses, and on the thermal diffusivities in pure liquids", *Chemical Physics Letters*, vol. 24, No. 1,2, Jul. 8, 1994 (pp. 61–68), T. Imai et al., "Over 10,000 km Straight Line Transmissin System Experiment at 2.5 Gb/s Using In–Line Optical Amplifiers", *Proceedings of 1992 Optical Amplifier Topical Meeting*, Presentation No. PD12, 1992 (pp. 280–283).

K. Yoneyama et al., "A Consideration of Optical Surge in Optical Amplifier Systems", *Proceedings of the Spring Conference of the IEICE*, Presentation No. B–941, 1993 (p. "4–79").

K. Yoneyama et al., "A Consideration of Optical Surge Suppression for EDFAs", *Proceedings of the General Conference of the IEICE*, Presentation No. B–1190, 1996 (p. 622).

Y. Sato et al, "A Study on Surge Protection Circuits in Erbium Doped Fiber Amplifier System", *Proceedings of the General Conference of the IEICE*, Presentation No. B–1191, 1996 (p. 623).

J. Schesser et al., "Design Requirements for the Current Generation of Undersea Cable Systems", *AT&T Technical Journal*, Jan./Feb. 1995 (pp. 16–32).

M. N. Nersisyan et al., "Analog of an ultrashort–pulse laser in the rf range", *Sov. Tech. Phys. Lett.*, vol. 14, No. 10, Oct. 1988 (pp. 770–771).

R. W. Keys et al., "Cerenkov second–harmonic generation in proton–exchanged lithium niobate waveguides", *Journal of Modern Optics*, vol. 37, No. 4, 1990 (pp. 545–553).

LIGHT INTENSITY ATTENUATOR AND ATTENUATING METHOD

TECHNICAL FIELD

The present invention relates to a device and method for attenuating light intensity of an optical signal (or a signal wave) which includes a surge component, which is output from an optical amplifier. More specifically, the present invention relates to a light intensity attenuator and attenuating method applied to a communication system using optical signals, in which an optical signal component having an extraordinarily high light intensity (i.e., a pulse-shaped optical surge), which was generated inside or outside the relevant optical signal transmission system, is attenuated (or arrested), and an optical signal component having a desired light intensity is output, thereby preventing components or elements belonging to the light-receiving side of the system from being damaged.

BACKGROUND ART

Practical communication systems using light as a signal such as a wavelength-division multiplexed (WDM) optical communication system are known, and longer-distance communication systems having a larger data capacity have been developed.

Recently, in order to increase the capacity, the wavelength-division multiplexed communication which attracts much attention uses advantageous characteristics of light and information signals transmitted via optical signals having a plurality of wavelengths. On the other hand, the direct optical amplification method using an erbium-doped optical fiber amplifier (EDFA) is also practical and transmission distance has rapidly progressed. However, in the optical communication systems using the EDFA, a pulse-shaped optical signal of high intensity may be generated. Therefore, in order to secure high stability and reliability of the system, it is necessary to protect relevant components such as light-receiving elements from damage due to the pulse-shaped high-intensity optical signal. Similar problems may occur in other electro-optic devices not only in the optical communication system.

Various causes with respect to the generation of the extraordinary pulse-shaped high-intensity optical signal are known, such as: (i) when the optical signal input into the system includes a high-intensity optical signal component, or (ii) when the optical signal is amplified in the system, a secondary high-intensity optical signal component is generated. In the optical communication system performing direct optical amplification using the erbium-doped optical fiber amplifier (EDFA), an extraordinary high-intensity pulse-shaped optical signal component may be included in the optical signal which was amplified using the EDFA (refer to T. Imai, et al., Proceedings of "1992 Optical Amplifier Topical Meeting", Presentation No. PD 12, 1992).

The reason for this phenomenon is that $Er^{3+}$ which has been excited to a higher level is stored in the EDFA with a high energy while no optical signal is input (that is, when no optical signal exists) in the EDFA, and that when an optical signal is input into the EDFA under the above situation, the stored high energy is rapidly stimulated and emitted so that the emitted portion is added to the input optical signal as an optical surge. Such an optical surge may damage or degrade a light-receiving element connected to the output side of the EDFA. Therefore, it is preferable that such an optical surge be removed.

A method for removing the above-explained optical surge, and also controlling generation of the optical surge in the optical transmission system including the EDFA is known, in which the optical signal transmitter raises the optical signal during a longer period of the "msec" order or more, so as to gradually emit the energy which was accumulated in the EDFA while no signal was being input (refer to Yoneyama, et al., Proceedings of the spring conference of the IEICE, Presentation No. B-941, p. 4–79, 1993).

Another method is known, which considers that the optical surge is generated due to the emission of energy which was accumulated in the EDFA during a non-signal period. In this method, before a target optical signal to be amplified is input into the EDFA, a dummy optical signal having a wavelength different from that of the target optical signal is previously merged with the target optical signal, and the power of the dummy signal is controlled so that the total of the power of the dummy signal and the power of the target signal is fixed, thereby maintaining a fixed amplification gain regardless of the level of the input optical signal. The input optical signal is then amplified using the EDFA without wavelength distortion, and the dummy optical signal is removed from the merged signal by using an optical wavelength-filtering means or the like (refer to Japanese Patent Application, First Publication, No. Hei 6-216452).

As another method similar to the above method, it is known that the wavelength of a dummy signal to be merged with the target optical signal is defined within 1545 to 1565 nm, which is a wavelength transition range of the stimulated emission from a higher level with respect to the EDFA, thereby more effectively depressing the optical surge (refer to Yoneyama, et al., Proceedings of the general conference of the IEICE, Presentation No. B-1190, p. 622, 1996).

As a practical example of the depression of the optical surge by using a dummy signal, a surge prevention circuit for transmitting a dummy signal during interruption of the target optical signal is known (refer to Sato, et al., Proceedings of the general conference of the IEICE, Presentation No. B-1191, p. 623, 1996).

It is necessary in the optical transmission system to prevent or remove the optical surge. All the above-explained conventional methods are to prevent or depress the optical surge which was generated in the amplification process using the EDFA.

In order to prevent or depress the surge, for example, the optical fiber amplifier shown in FIG. 1, which is disclosed in Japanese Patent Application, First Publication, No. Hei 6-216452, comprises many components such as optical coupler 1, dummy signal semiconductor laser emitter 2, dummy signal semiconductor laser emission control circuit 3, light-receiving element 4, optical beam splitter 5, optical multiplexer 6 for multiplexing a dummy optical signal and an excited optical signal, semiconductor laser emitter 7 for excitation, drive circuit 8 for the semiconductor laser emitter for excitation, optical isolators 9 and 11, amplification section 10 comprising a rare-earth-element-doped optical fiber, and optical filter 12. This arrangement indicates the problem that a plurality of optical components and control circuits such as optical coupler 1, dummy signal semiconductor laser emitter 2, dummy signal semiconductor laser emission control circuit 3, light-receiving element 4, and optical beam splitter 5, must be added to the EDFA.

Generally, the optical transmission system requires a high reliability. To increase the number of components and circuits used in the system mostly degrades the reliability. That is, the system reliability is generally estimated by adding values of the reliability parameter (called the failure rate or the FIT number) with respect to individual components in the system arrangement. Therefore, increase of the components directly causes decrease of the (total) reliability of the system. In particular, the reliability parameter applied to an optically active component such as a laser emitter is lower than that of a passive component such as an optical coupler by the order of one or two digits. Therefore, in order to improve the system reliability, an additional design for making a constitution of multi-components and multi-circuits is necessary, and simultaneously, the system arrangement and the estimate of the reliability themselves become complicated (refer to, for example, J. Schesser, et al., AT & T Technical Journal, p. 16, January/February, 1995).

Accordingly, in order to depress the optical surge generated by the EDFA in the optical transmission system, it is preferable to use as small a number of components as possible by selecting components which can depress the optical surge, so that the conventional method which demands addition of many components (including active components) and circuits is unnecessary. It is furthermore preferable that only optic—optic interactive components, which need no electric control circuit, be added.

The following are known methods for simply attenuating the transmitted optical signal: cladding the surface of the optical waveguide and using a calcite or glass waveguide. However, in these conventional methods, it is difficult to accurately control the optical attenuation by a desired amount, and so the necessary optical signal as well as the unnecessary high-intensity signal is also attenuated.

On the other hand, an optical fuse type, which uses a burnout phenomenon due to high-intensity light input into an end face of a compound semiconductor optical waveguide, disclosed in Japanese Patent Application, First Publication, No. Hei 9-146056, cannot be used plural times because an irreversible phenomenon such as the burnout is used.

DISCLOSURE OF INVENTION

It is an object of the present invention to solve the above-mentioned conventional problems, and to provide a light intensity attenuator and attenuating method with fewer optical components and circuits, by which light intensity is attenuated using a simpler system arrangement and an optical signal component having desired light intensity is output, thereby preventing the components or elements at the light-receiving side from suffering an optical damage.

To achieve the above object, the present invention provides a light intensity attenuating method used for an optical transmission system which includes a light intensity attenuator, comprising the steps of: extracting an optical signal transmitted in the optical transmission system by using a light input means; receiving the optical signal via the light input means, and attenuating the light intensity of a pulse-shaped surge component included in the optical signal by a desired amount by using a light-intensity attenuating means, and outputting the optical signal from the light-intensity attenuating means; returning the optical signal output from the light-intensity attenuating means to the optical transmission system by using a light output means.

As a device for implementing the above method, the present invention provides a light intensity attenuator incorporated in an optical transmission system comprising: light input means for extracting an optical signal transmitted in the optical transmission system; light-intensity attenuating means for receiving via the light input means the transmitted optical signal which includes a pulse-shaped surge component, attenuating the light intensity of the surge component by a desired amount, and then outputting the optical signal; and light output means for returning the output from the light-intensity attenuating means to the optical transmission system.

The following are two preferable embodiments with respect to the above light intensity attenuating method and attenuator:

(1) The light-intensity attenuating means comprises a substrate and an optical waveguide formed on the substrate, at least one of the substrate and the optical waveguide being made of a material producing a nonlinear optical effect. The light input means is an input optical fiber which is optically connected to the input end of the optical waveguide, and the light output means is an output optical fiber which is optically connected to the output end of the optical waveguide. The refractive index of the optical waveguide with respect to the optical signal is smaller. than the refractive index of the substrate with respect to a higher harmonic of the optical signal, and a part of the optical signal input into the optical waveguide is wavelength-converted by the nonlinear optical effect into a light portion having a wavelength shorter than that of the optical signal. This wavelength-converted light portion is scattered and radiated from the optical waveguide over a neighboring area of the substrate, and the remaining portion of the optical signal is output from the output end of the optical waveguide into the output optical fiber.

(2) In the light-intensity attenuating means of the other embodiment, the optical scattering operation having a polar-molecule liquid is used. In this case, the light input means has an output face from which the optical signal is output, and the light input means is optically connected to the input end of the light-intensity attenuating means. This means can be realized, for example, using an optical fiber. The light-intensity attenuating means comprises an a light-scattering means which contains a polarmolecule liquid including polar molecules, and at least a portion of the optical signal, which was incident from the light input means on the polar-molecule liquid, is scattered, and at least a portion of the optical signal, which was transmitted through the polarmolecule liquid, is received by the light output means.

According to the present invention, a pulse-shaped optical surge can be attenuated using a simpler arrangement, and an optical signal component having desired light intensity can be output. Therefore, it is possible to avoid components or elements at the receiving side from suffering optical damage.

According to the above embodiment (1), the optical signal is transmitted along the optical waveguide while the light intensity (i.e., power) thereof is attenuated because a part of the optical signal is converted into a higher harmonic. This transmitted optical signal is input into the optical fiber connected to the output end of the waveguide. The higher harmonic component is radiated over a semi-conical area along the optical waveguide and also radiated from the end of the substrate; thus, little of the higher harmonic component is input into the core of the optical fiber. Therefore, it is possible to efficiently remove the optical surge using a simpler arrangement, and this method is remarkably effective for improving the stability and reliability of the optical communication system. In order to reduce the amount of the higher harmonic component merged into the core of the optical fiber, the optical waveguide may have at least one bent portion between its input end and its output end. In this case, the axis of input light at the input end does not align with the axis of output light at the output end.

On the other hand, according to the above embodiment (2), the motions of the polar molecules in the polar-molecule liquid are isotropic. Therefore, the vibration directions of the molecules in the liquid, which received the energy of the input optical signal and were excited, are totally random and isotropic. Additionally, in the polar-molecule liquid, molecular vibration corresponding to a specific energy is not used; thus, no specific light absorbing characteristic is necessary. Therefore, the operation and effect of this embodiment are substantially or almost independent of the wavelength and the polarization. Therefore, an optical signal having extraordinary high light intensity can be easily and accurately attenuated without depending on the wavelength and polarization.

MODES FOR CARRYING OUT THE INVENTION

Hereinbelow, preferred embodiments of the present invention will be explained in detail with reference to the drawings.

First Embodiment

The waveguide-type light intensity attenuator in the first embodiment employs wavelength conversion using a non-linear optical effect, as a typical example based on the optic—optic interaction. More specifically, a nonlinear optical effect known as the "Cherenkov radiation" is used.

In Cherenkov radiation, when a part of the guided wave (i.e., the fundamental wave) is consumed and a higher harmonic is generated due to a nonlinear optical effect produced by an optical wave-guiding material, the higher harmonic is scattered and radiated from the optical wave-guided area over a semi-conical area on the substrate if the refractive index of the waveguide with respect to the optical signal is smaller than the refractive index of the substrate with respect to the generated higher harmonic.

Figure 2:
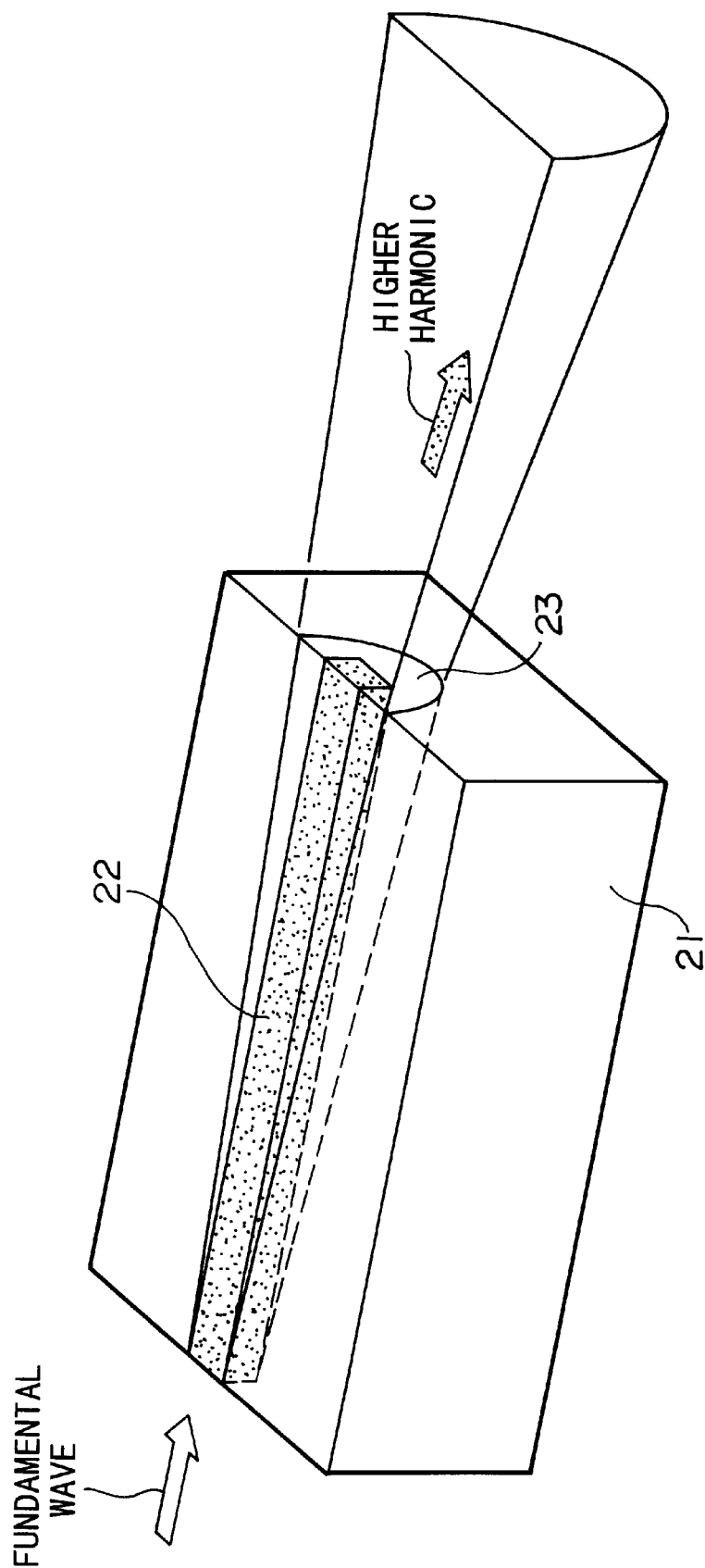
FIG. 2 is a diagram for explaining the Cherenkov radiation phenomena.

FIG. 2 is a diagram for explaining the Cherenkov radiation. Optical waveguide 22 is formed on substrate 21. When a fundamental wave is input into the optical waveguide 22 and a higher harmonic is generated, the higher harmonic is radiated and scattered from optical waveguide 22 over a semi-conical area 23 (as shown in FIG. 2) on substrate 21 if the refractive index of the waveguide 22 is smaller than the refractive index of the substrate 21 with respect to the generated higher harmonic. Such a waveguide element using the Cherenkov radiation has been investigated for many years as a shorter wave generator using the radiated (second) higher harmonic (refer to, for example, M. N. Nersisyan, et al., Sov. Tech. Phys. Lett., 14(10), p. 770, 1988, or R. W. Keys, et al., J. Modern Opt., 37(4), p. 545, 1990).

The present embodiment uses a known phenomenon such as the Cherenkov radiation. However, the higher harmonic radiated on the substrate is not used, and the phenomenon that a part of the fundamental wave is consumed and attenuated as a result of the optic—optic interaction via a nonlinear optical effect such as the higher-harmonic generation is targeted, and this phenomenon is positively used in the device for attenuating the light intensity of the optical signal.

Here, the higher harmonic radiated from the end of the substrate is an unwanted component merged with the fundamental-wave signal, and it is unnecessary to collect or converge such a higher harmonic. The collection of the radiated higher harmonic has been considered to be one of the problems when using the Cherenkov radiation. In the present embodiment, the collection itself (of the higher harmonic) is unnecessary and a means for transmitting the fundamental wave (corresponding to the optical signal in the present embodiment), which gradually decays according to the wave-guiding operation on the substrate, to the next element or device is necessary. In addition, it is more preferable that the generated higher harmonic component be not merged into the optical signal output from the optical waveguide, whose light intensity has been attenuated.

Therefore, in the light intensity attenuator in the present embodiment, an optical fiber is combined with the so-called Cherenkov-radiation type optical waveguide element, so as to extract a fundamental wave (i.e., optical signal) component transmitted in the optical waveguide.

First Example

An example of the waveguide-type light intensity attenuator according to the present embodiment will be explained with reference to FIG. 3.

Figure 3:
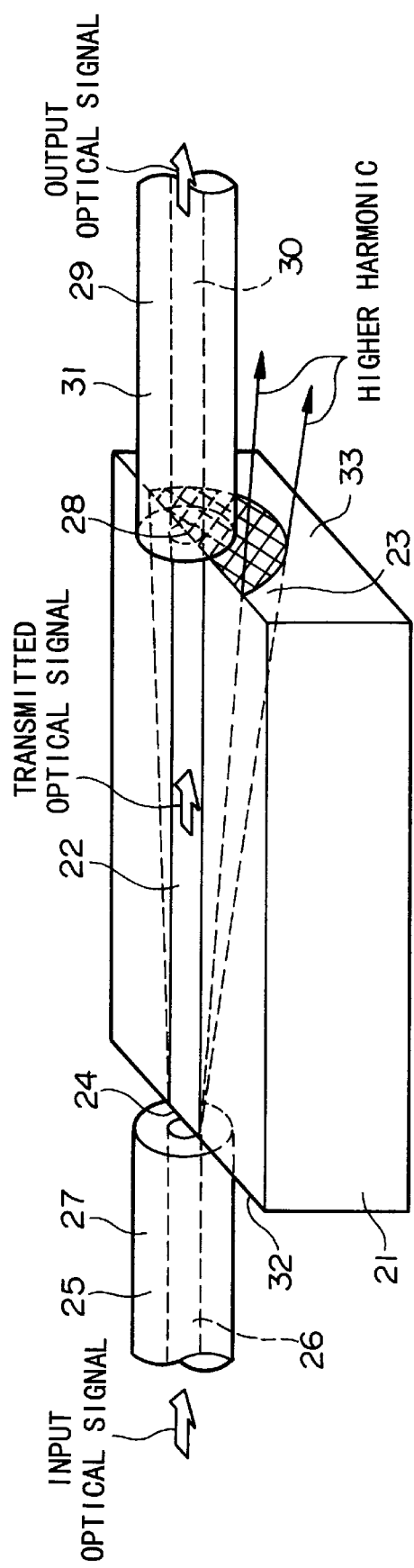
FIG. 3 is a diagram for explaining the structure of the first example of the waveguide-type light intensity attenuator according to the first embodiment.

In FIG. 3, optical waveguide 22 is formed on the surface of substrate 21. The end face of the core 26 of optical fiber 25 (consisting of core 26 and clad 27 which covers the core) for inputting an optical signal is optically connected to the light-input end face 24 of the optical waveguide 22. The end face of the core 30 of optical fiber 29 (consisting of core 30 and clad 31) for outputting the optical signal is optically connected to light-output end face 28 of the optical waveguide 22. In order to more firmly couple each optical fiber with the optical waveguide for transmitting and receiving the optical signal, it is preferable that such a pair of the optical fibers adhere respectively to both end faces of the optical waveguide.

At least one of the optical waveguide 22 and the substrate 21 is made of a material exhibiting a nonlinear optical effect. If an optical signal is input into the optical waveguide 22, the waveguide 22 has a refractive index for wave-guiding the optical signal at the wavelength of this signal. On the other hand, the substrate has a refractive index for wave-guiding a light beam having a shorter wavelength than that of the above optical signal. That is, the substrate and the optical waveguide are selected and coupled s o as to satisfy conditions necessary for the Cherenkov radiation with respect to the higher harmonic.

Accordingly, a wavelength-conversion phenomenon due to the nonlinear optical effect must occur at least at an interface between the optical waveguide and the substrate. To realize this condition, one or both of the optical waveguide and the substrate are made of material(s) which produce a nonlinear optical effect. Here, in order to leak a higher harmonic component into the substrate, the refractive index of the substrate with respect to the optical wavelength of the higher harmonic component must be larger than the refractive index of the optical waveguide with respect to the optical signal.

Such a relationship between these refractive indexes can be achieved, for example, by forming a n optical waveguide on the surface of a lithium-niobate ($LiNbO_3$) substrate, the refractive index of the waveguide being a little larger than that of the substrate, by using the proton exchange method or the titanium thermal diffusion method. The refractive index of the lithium-niobate substrate is larger for shorter-wavelength light, as with most substances. If an optical signal having wavelength in the 1.5 $\mu$m band is used (this wavelength is popular for optical transmission systems), the refractive index with respect to the second harmonic of the optical signal is sufficiently larger than the refractive index of the waveguide versus the optical signal. If the waveguide is formed on a lithium-niobate substrate by using the diffusion method, both the optical waveguide and the substrate produce a nonlinear optical effect.

In the light intensity attenuator as shown in FIG. 3, if an optical signal is input via the input optical fiber 25 into the optical waveguide 22 on the substrate 21, at least one of the substrate 21 and the optical waveguide 22 produces a nonlinear optical effect, and thus a portion of the optical signal transmitted through the optical waveguide 22 is wavelength-converted to have a wavelength shorter than that of the input optical signal (generally, converted into the second harmonic of the half wavelength). This wavelength-converted optical signal (i.e., the higher harmonic component) is radiated due to the Cherenkov radiation from the optical waveguide 22 over the semi-conical area 23 of the substrate 21 (that is, the signal leaks from the optical waveguide to the substrate and is removed to the outside of the optical waveguide, and the light intensity (or power) of the optical signal is attenuated), and the remaining optical signal is output from the output end face 28 of the optical waveguide into core 30 of the output optical fiber 29. Therefore, the amount of the wavelength-converted optical signal (that is, a noise) output into optical fiber core 30 is very small.

Figure 1:
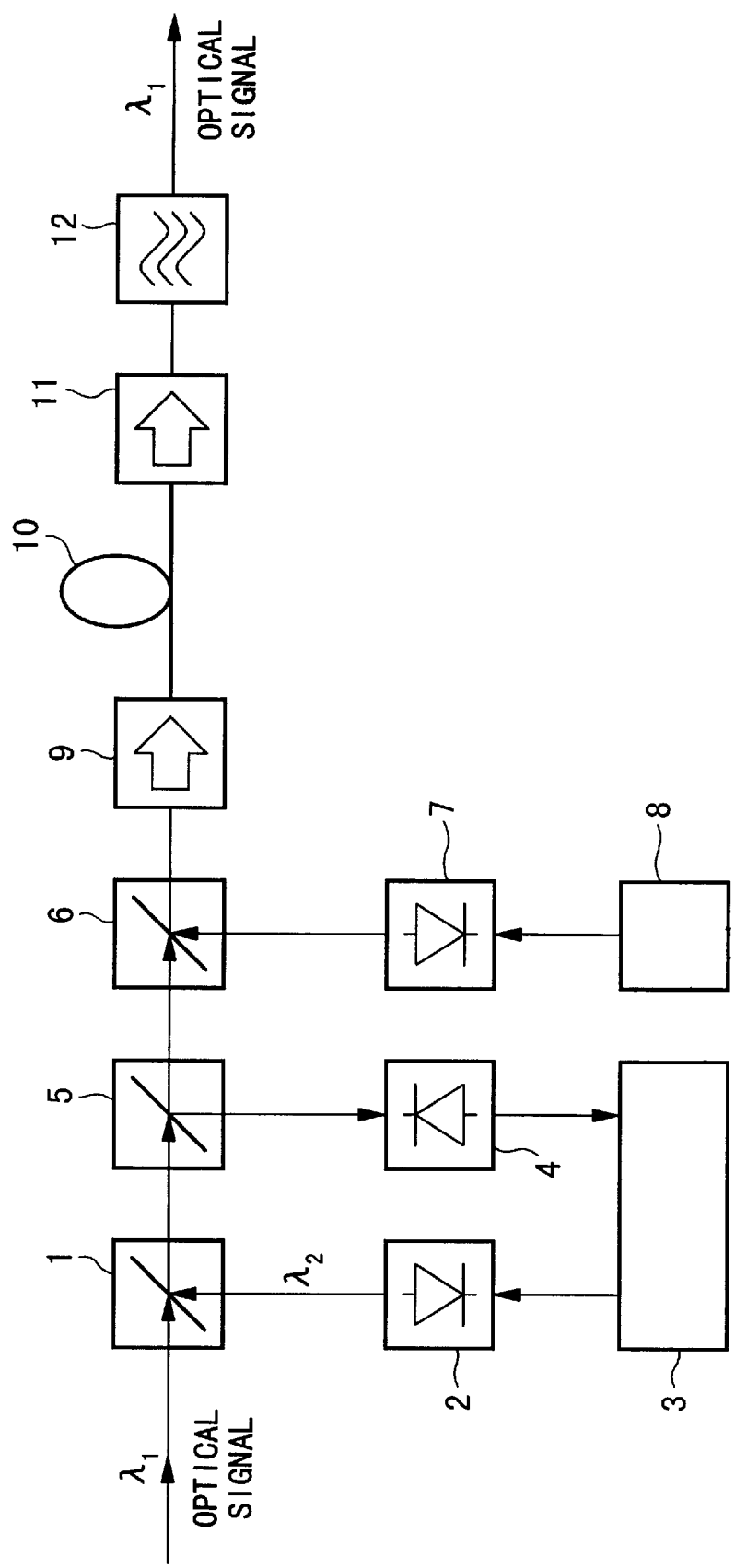
FIG. 1 shows a conventional arrangement for preventing and depressing the optical surge generated in the EDFA amplification process.

The light intensity attenuator of the present embodiment is typically applied to the above-described optical transmission system comprising an optical amplifier such as the EDFA. In this case, the optical signal output from the optical amplifier such as the EDFA is input into an end of the optical waveguide via an optical fiber. For example, in the device as shown in FIG. 1, the present light intensity attenuator can be placed after the EDFA and can replace the structural elements 1 to 5. In most of the optical transmission systems including the EDFA, as shown in the conventional example of FIG. 1, optical wavelength filter 12 for extracting the optical signal is provided so as to remove a pump wave, used for activating the EDFA, from the optical signal. Therefore, even if a small amount of the higher harmonic component leaks into the optical fiber in the light intensity attenuator of the present embodiment, this leaked component can be removed at the following stage using a similar wavelength filter. As explained above, it is possible to add an additional optical component for practical use of the present light intensity attenuator.

On the other hand, in the light intensity attenuator as shown in FIG. 3, the optical waveguide 22 linearly extends from one end face 32 of the substrate 21 towards the other end face 33, both end faces face each other (that is, are parallel with each other). This arrangement has the shortest optical waveguide and thus has an effect that attenuation of the light intensity of the transmitted optical signal is at a minimum level.

Second Example

Figure 4:
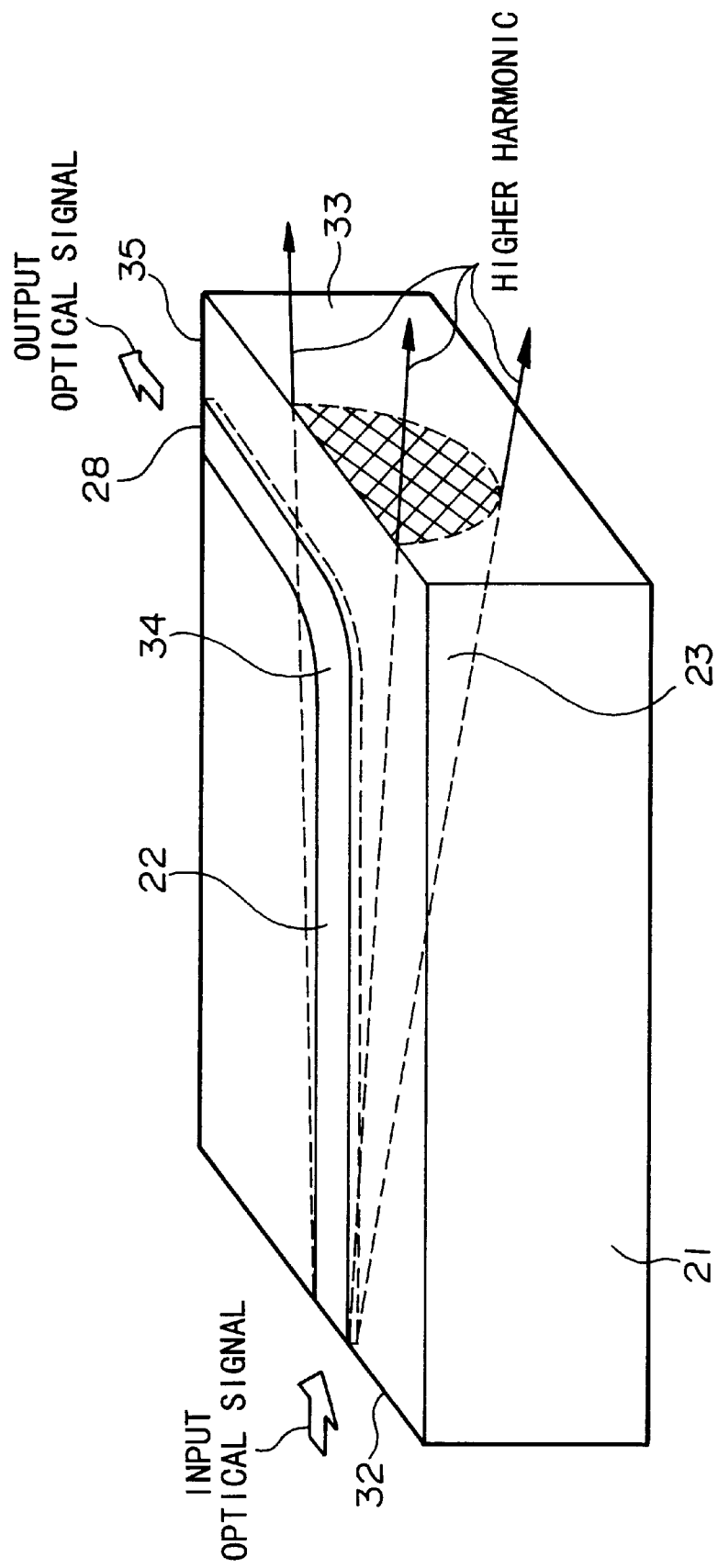
FIG. 4 is a diagram for explaining the structure of the second example of the waveguide-type light intensity attenuator according to the first embodiment.

FIG. 4 shows the second example of the waveguide-type light intensity attenuator according to the present embodiment. The present example and the following examples are variations obtained by modifying the shape of the optical waveguide 22 of the first example, and basic functions obtained by using the Cherenkov radiation are similar in these examples.

In FIG. 4, optical waveguide 22 has portion 34 which bend towards another direction, and output end face 28 of the waveguide 22 is formed on face 35 which intersects with end face 32 of substrate 21 on which the input end face is formed. Accordingly, the output optical signal is output towards the direction as shown in FIG. 4.

However, the wavelength-converted optical signal, radiated from optical waveguide 22 over semi-conical area 23 on substrate 21, is not bent and proceeds forward, and is radiated from end face 33 of the substrate 21 to the outside of the substrate. Therefore, this arrangement has an advantage that the amount of the wavelength-converted optical signal is smaller than that in the first example as shown in FIG. 3.

Third Example

Figure 5:
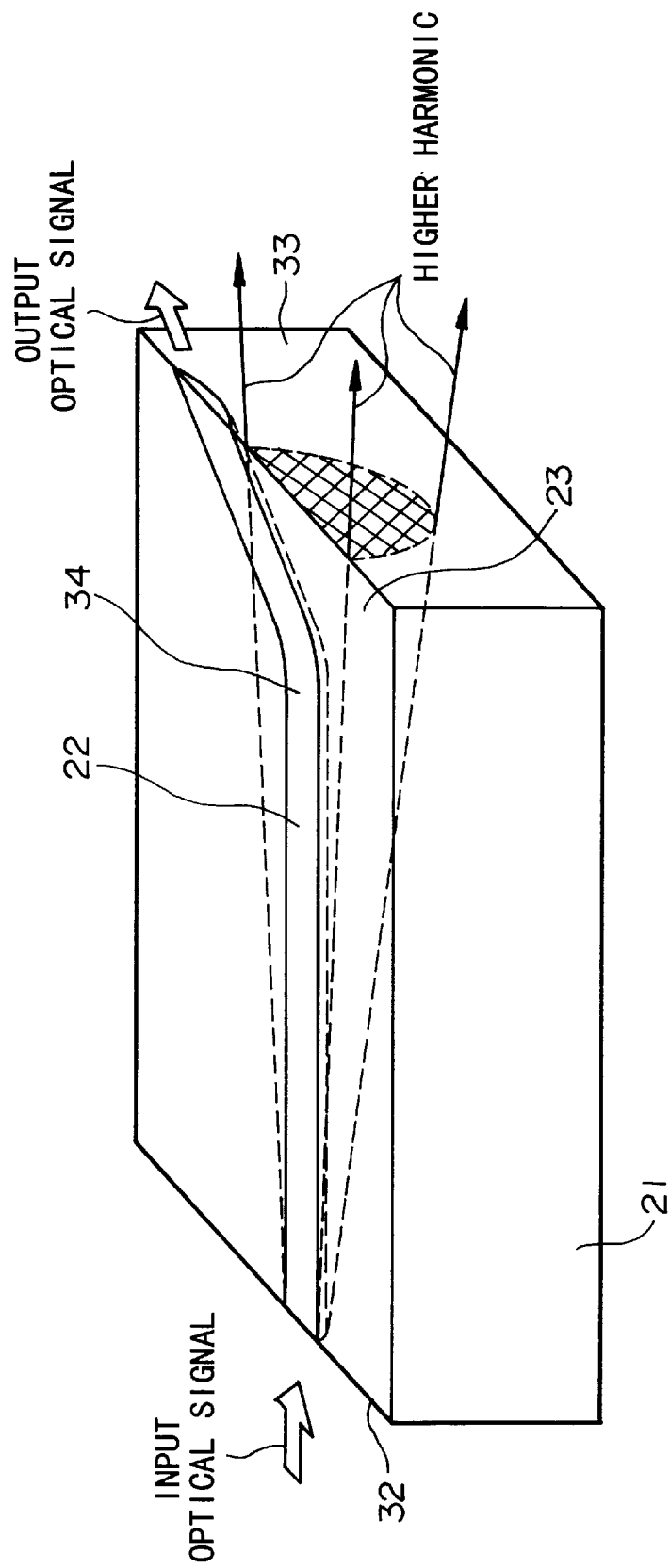
FIG. 5 is a diagram for explaining the structure of the third example of the waveguide-type light intensity attenuator according to the first embodiment.

FIG. 5 shows the third example of the waveguide-type light intensity attenuator according to the present embodiment.

In FIG. 5, optical waveguide 22 also has bent portion 34 as in the above second example; however, the degree of bending is smaller than that in the second example as shown in FIG. 3. In the present embodiment, the output end face of the optical signal is formed on face 33 which is parallel with input face 32 of substrate 21; however, the position of this output end face of the optical signal is determined so as not to overlap with the radiation face of the wavelength-converted optical signal. Accordingly, the amount of the wavelength-converted optical signal which is merged into the output optical signal can be reduced while the degree of bending of the optical waveguide can be smaller.

Fourth Example

Figure 6:
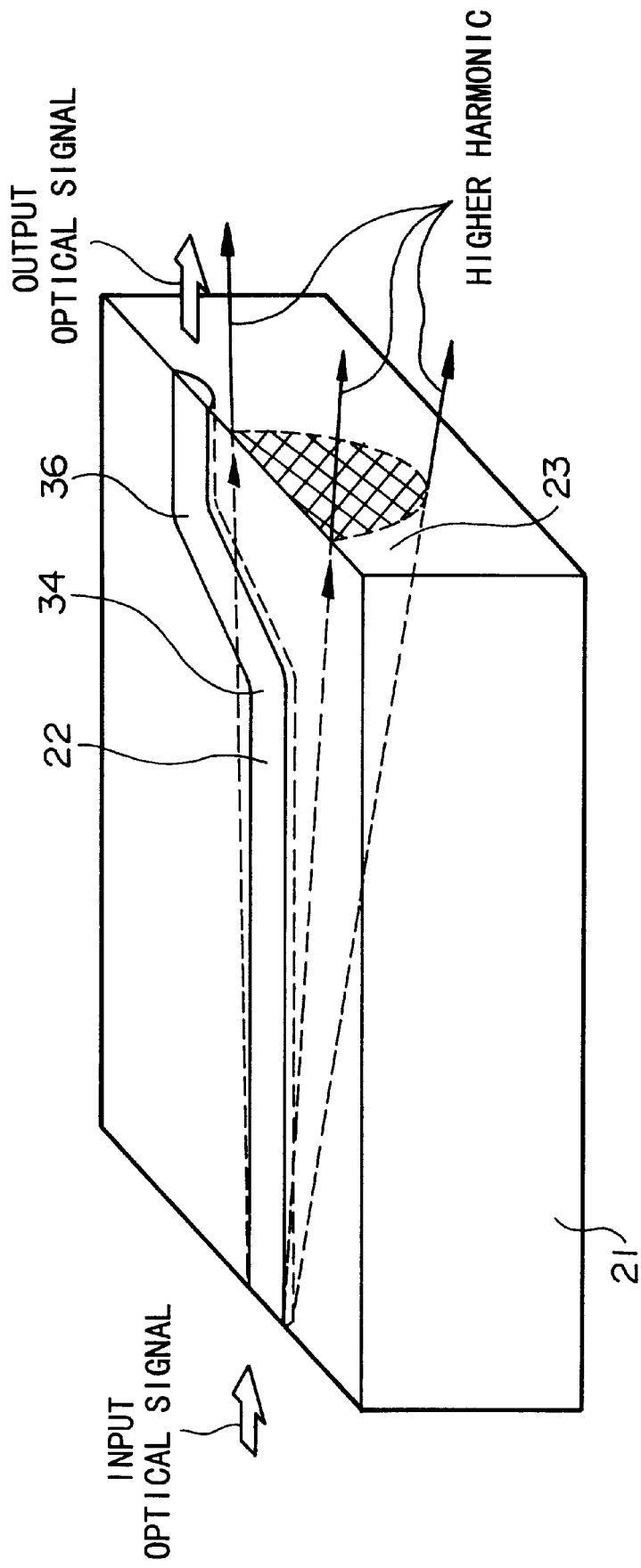
FIG. 6 is a diagram for explaining the structure of the fourth example of the waveguide-type light intensity attenuator according to the first embodiment.

FIG. 6 shows the fourth example of the waveguide-type light intensity attenuator according to the present embodiment.

In FIG. 6, optical waveguide 22 has two bent portions 34 and 36, and the output end face of the optical signal is formed on face 33 which is parallel with the input face 32 of substrate 21. However, the position of this output end face of optical waveguide 22 does not overlap with the radiation face of the wavelength-converted optical signal. In this arrangement, the amount of the wavelength-converted optical signal which is merged into the output optical signal can be reduced while the direction of the output optical signal can be parallel with that of the input optical signal.

In the light intensity attenuators shown in the above examples, Ti is vacuum-deposited on the $LiNbO_3$ substrate to make a desired pattern having the width of 7 $\mu$m, the thickness of approximately 70 nm, and this substrate having the pattern is subjected to the thermal diffusion in an oxygen atmosphere at 980° C., thereby making a diffusion waveguide. In the next process, optical fibers are connected to both ends of the optical waveguide (in FIG. 3, the length of the waveguide is approximately 60 mm), thereby completing the light intensity attenuator (or attenuating element). In the experiment, when a light beam having wavelength of 1.5 $\mu$m was input into one of the optical fibers, a light beam having the same wavelength, whose light intensity was attenuated, was output from the other optical fiber.

The substrate and the waveguide may be made of different materials, and the optical waveguide component of a different material may be deposited on the substrate.

In order to control the input of the higher harmonic component into the optical fiber as perfectly as possible, it is effective, as shown in FIGS. 4 to 6, that the bent portion(s) be provided in the optical waveguide so that the end area of the substrate toward which the higher harmonic component is radiated and the output end of the optical waveguide do not overlap with each other. In the Cherenkov radiation, the generated second harmonic is increased in proportion with the square of the power of the guided wave (i.e., the optical signal), while the generated second harmonic is in proportion with the length of the waveguide, that is, the working length. Therefore, the amount of a higher harmonic component generated within a shorter portion of the waveguide is very small. For example, in FIG. 4, the portion of the waveguide path after the bent portion is shorter; thus, the optical signal can be output while almost completely avoiding the radiation area of the higher harmonic.

Second Embodiment

In the polar-molecule liquid used in the second embodiment according to the present invention, the polar molecule includes an electric dipole in the natural state, and the efficiency of the dipole is changed by vibration. When light is incident on a polar molecule, molecular vibration is induced, thereby attenuating the light intensity of the incident light. In addition, if light having a considerably high intensity is incident, heat is locally generated due to excited polar molecules. The optical refractive index of the heated polar molecules is locally changed, and thus the so-called thermal lens effect occurs and the refractive index distribution of the optical path includes distortion, thereby scattering the incident light. By cutting this scattered light at the light-receiving side, a part of the output signal can be removed, and an optical signal whose light intensity has been attenuated can be input into the receiving side.

In particular, the thermal lens effect appears conspicuously in a high-intensity optical component; thus, such a high-intensity optical component can be scattered and removed while the attenuation of the low-intensity target optical signal is kept small.

Using the polar-molecule liquid so as to scatter a part of the output light and attenuate the intensity of the output light leads to the following advantages:

(1) In the liquid consisting of polar molecules, the polar molecules substantially perform random motions at room temperature; thus, when light output from a light input means is incident on the liquid, the motions of the polar molecules exhibit isotropic relationships. Though the vibration direction is peculiar to each molecule based on its molecular structure, the vibration directions of molecules are totally random and isotropic. Therefore, the excitation of polar molecules caused by the incident light is substantially independent of the polarization state of the incident light.

(2) The molecules in the liquid generally have a longer mean free path and a lower viscosity in comparison with the solid, and thus generally have a lower heat conductivity. Therefore, the local-heating effect of the polar-molecule liquid caused by the incident light has a considerable level, and the above thermal lens effect can be more effectively used in comparison with a solid.

(3) The polar-molecule gas can be used as a light-scattering medium in principle. However, the distribution density of molecules which interact with the incident light is remarkably small in this case; thus, the thermal lens effect based on the light-scattering effect, that is, the light-intensity attenuating effect, is almost insufficient for practical use. In contrast, according to the polar-molecule liquid in the present embodiment, the light-intensity attenuating effect of a sufficiently high level can be achieved.

In the polar-molecule liquid used in the present embodiment, the direction of the vibrating component of each molecule which interacts with light has two types: electronic orientation and ionic orientation. In the present embodiment, the vibrating components are used as molecular-bond components which can be optically excited.

The following are examples of polar-molecule liquids: water, liquid alkylbenzene (e.g., benzene compound substituted with straight chain $C_1$ to $C_6$ alkyl, for example, toluene ($C_6H_5CH_3$), ethylbenzene), liquid aliphatic ketone (e.g., $C_3$ to $C_6$ aliphatic ketone such as acetone and methyl ethyl ketone), and liquid aliphatic alcohol (e.g., $C_1$ to $C_6$ alcohol such as methyl alcohol and ethyl alcohol). As for the polar-molecule liquid used in the present embodiment, molecular vibration corresponding to a specific energy is not used; thus, no specific light absorbing characteristic is necessary. Therefore, the operation and effect of the present embodiment are substantially or almost independent of the wavelength.

The light intensity attenuator and attenuating method of the present embodiment will be further explained with reference to the drawings.

First Example

Figure 7:
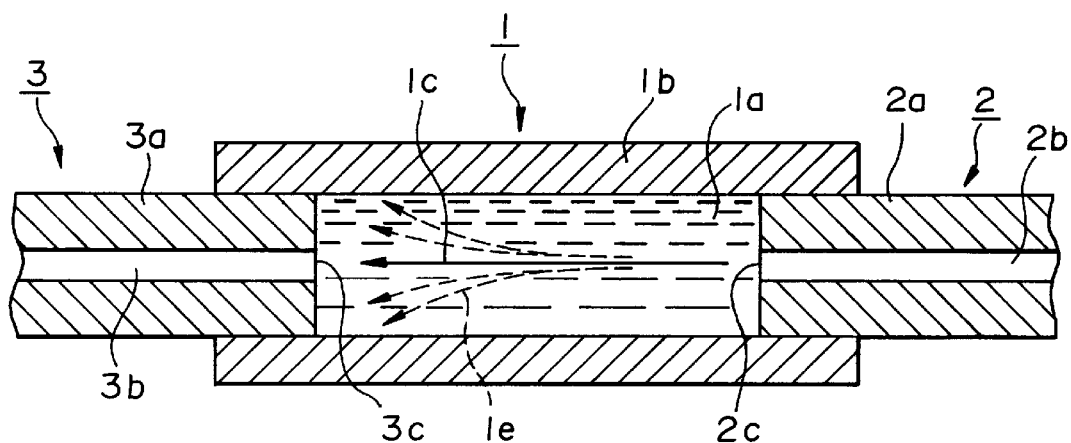
FIG. 7 is a sectional view for explaining the structure of the first example of the light intensity attenuator according to the second embodiment.

In the first example of the light intensity attenuator (as shown in FIG. 7) of the present embodiment, light-scattering device 1 consists of polar-molecule liquid 1a and container 1b (such as a pipe) which contains the polar-molecule liquid. Input optical fiber 2 is tightly inserted into one of the side faces (which face each other) of the container 1b, and thus this side face is sealed. The input optical fiber 2 consists of core 2b for transmitting light and clad 2a which covers the core. The head face of optical fiber 2 is exposed as light output face 2c in polar-molecule liquid 1a.

Output optical fiber 3 is tightly inserted into the other side face of container 1b, and this side face is also sealed. This output optical fiber 3 consists of core 3b for transmitting light and clad 3a which covers the core. The head face of optical fiber 3 is exposed as light output face 3c in polar-molecule liquid 1a. The optical axes of input optical fiber core 2a and output optical fiber core 3b substantially align with each other.

When light (i.e., an optical signal) is input from core 2b of input optical fiber 2 so as to make the light incident from light output face 2c on polar-molecule liquid 1a, the polar molecules distributed in optical path 1c receive and absorb light energy, thereby attenuating the light intensity. At the same time, the polar molecules are excited by the light energy and heated, thereby changing the refractive index. Accordingly, a part of the incident light is scattered so that scattered light 1e is generated, thereby attenuating the light-intensity density.

The light transmitted through the polar-molecule liquid along optical path 1c is input from light input face 3c into optical fiber core 3b, and is transmitted through this optical fiber so as to be input into a target optical component or element. The intensity of the light input into the light input face is lower than that of the light output from the light output face, and the amount of decrease of the light intensity can be suitably controlled using the kind or temperature of the polar-molecule liquid 1a, or the length of optical path 1c.

Second Example

Figure 8:
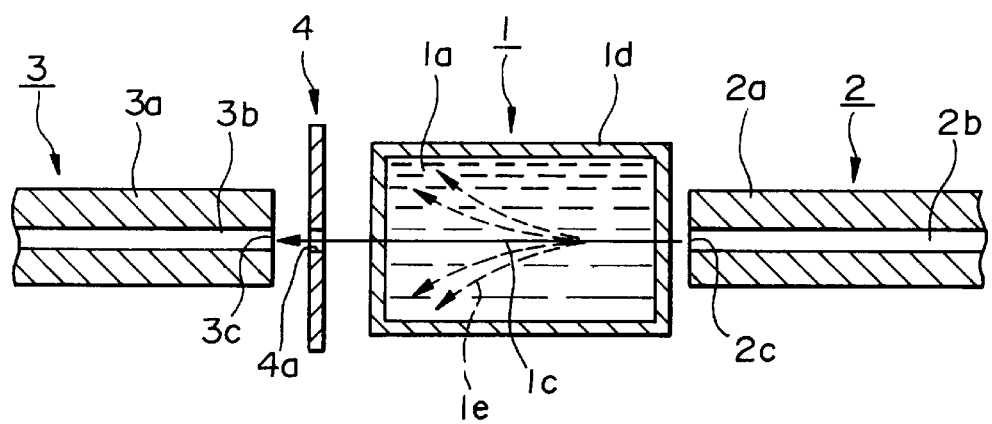
FIG. 8 is a sectional view for explaining the structure of the second example of the light intensity attenuator according to the second embodiment.

In the second example of the light intensity attenuator (as shown in FIG. 8) according to the present embodiment, the light-scattering device 1 consists of transparent container (for example, made of quartz) 1d and polar-molecule liquid 1a contained in container 1d. Input optical fiber 2 and output optical fiber 3 are arranged at the side faces (of device 1) which face each other. The axes of optical fiber cores 2b and 3b substantially align with each other.

In this example, optical diaphragm plate 4 functioning as optical diaphragm means is placed between light input face 3c of output optical fiber 3 and a side face (which faces the input face 3c) of container 1d, and a transparent hole is formed at the area where optical path 1c intersects the diaphragm plate. The opening area of this transparent hole can be suitably adjusted to have a desired size.

Instead of optical diaphragm plate 4, optically transparent areas may be respectively provided in a side face which faces light output face 2c and in another side face which faces light input face 3c, the remaining areas of these side faces being opaque, so as to control the amount of light incident on the polar-molecule liquid. Accordingly, scattered light 1e can be absorbed or cut off, and thus the amount of light, transmitted through the polar-molecule liquid and input into the light input face 3c, can be controlled.

In the light intensity attenuator as shown in FIG. 8, the light output from the light output face of the input optical fiber 2 passes through one side face of container 1d along optical path 1c, and is incident on polar-molecule liquid 1a.

Therefore, scattered light 1e is generated, thereby attenuating the relevant light intensity. The light transmitted through polar-molecule liquid 1a passes through the other side face of container 1d, and only a part of this light passes through transparent hole 4a of diaphragm plate 4. The light which passed through this diaphragm plate is input via light input face 3c of output optical fiber 3 into core 3b of the optical fiber 3, and is transmitted through this optical fiber and input into a desired optical component or element.

Third Example

Figure 9:
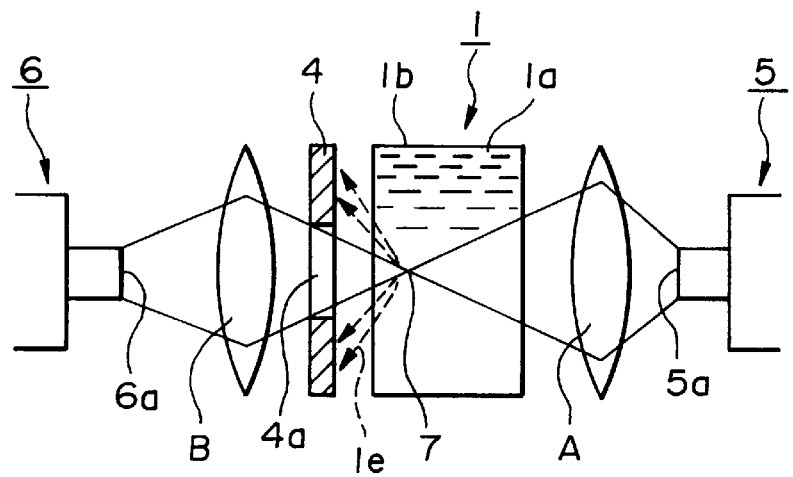
FIG. 9 is a sectional view for explaining the structure of the third example of the light intensity attenuator according to the second embodiment.

In the third example of the light intensity attenuator (as shown in FIG. 9) according to the present embodiment, lens A is placed between light output face 5a of light input section 5 and a side face (which faces the face 5a) of light-scattering device 1, while lens B is placed between light input face 6a of light output section 6 and another side face (which faces the face 6a) of light-scattering device 1. In addition, optical diaphragm plate 4 as optical diaphragm means is placed between lens B and light-scattering device 1.

In the arrangement of the example shown in FIG. 9, focus 7 of lens A exists between lens A and optical diaphragm plate 4, and light which passed through lens B is converged on light input face 6a.

In the light intensity attenuator as shown in FIG. 9, the light output from light output face 5a of light input section 5 passes through lens A and is incident on polar-molecule liquid 1a of light-scattering device 1. In this liquid 1a, a part of the light whose intensity has been attenuated passes through transparent hole 4a of the diaphragm plate 4, and is refracted via lens B. At least a part of the refracted light is converged on light input face 6a of light output section 6. In order to increase the light-intensity density and cause a large thermal lens effect, it is preferable that focus 7 of lens A exists within the polar-molecule liquid 1a, as shown in FIG. 9.

Figure 10:
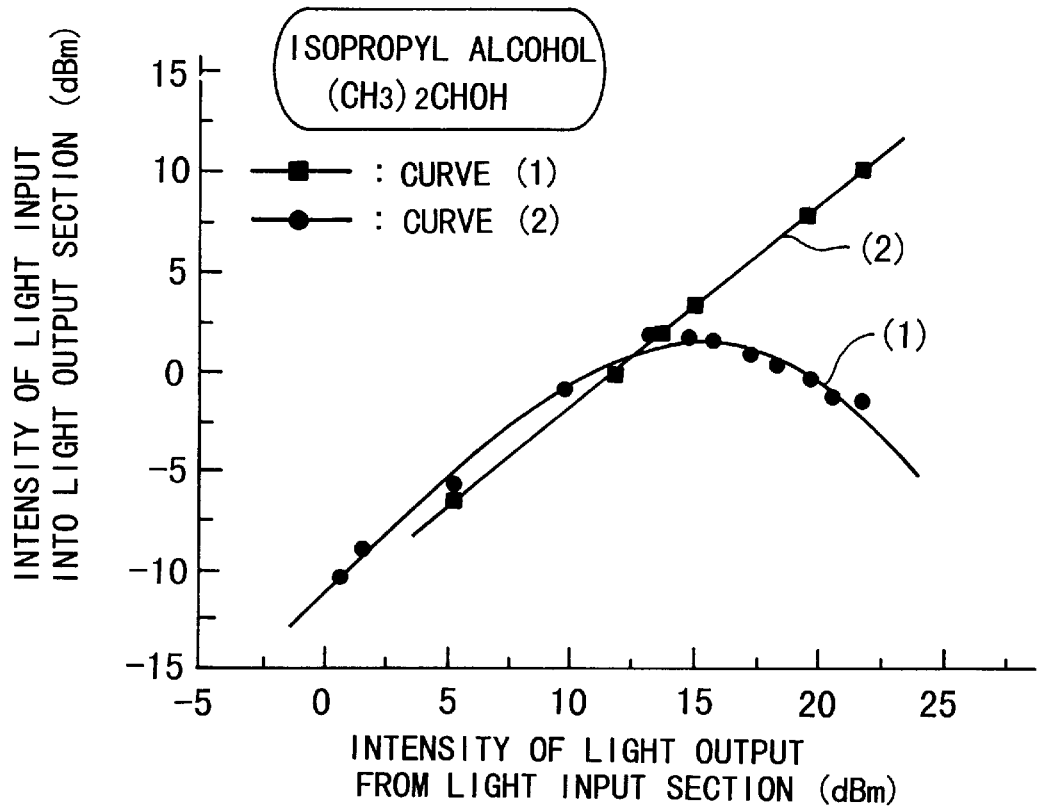
FIG. 10 is a graph diagram showing the relationship between the intensity of light output from the light input section and the intensity of light input into the light output section, obtained by using the light intensity attenuator as shown in FIG. 9 and isopropyl alcohol as the polar-molecule liquid.

FIG. 10 shows experimental results relating to the light intensity attenuator as shown in FIG. 9, obtained by using isopropyl alcohol $((CH_3)_2CHOH)$ as the polar-molecule liquid, and inputting light having wavelength of 1.49 μm into the above liquid. A relationship between (i) the intensity of light output from the light input section and (ii) the intensity of light output from the polar-molecule liquid along the optical path, that is, the intensity of light input into the light output section, is shown in FIG. 10. Here, the following are two conditions used in the experiment:

Condition 1: The incident light is converged at focus 7 (of lens A) in the polar-molecule liquid, so as to produce a large thermal lens effect (see curve (1) in FIG. 10).

Condition 2: The incident light is converged at focus 7 outside the polar-molecule liquid, that is, after passing through the polar-molecule liquid, so as to decrease the light-intensity density and produce a weak thermal lens effect (see curve (2) in FIG. 10).

That is, curve (1) indicates a case of inputting high-intensity light, where the intensity of the light input into the light output section is attenuated due to scattering in isopropyl alcohol. On the other hand, in the case indicated by curve (2), attenuation of low-intensity light such as an optical signal, input into the light output section, is independent of the light intensity.

Figure 11:
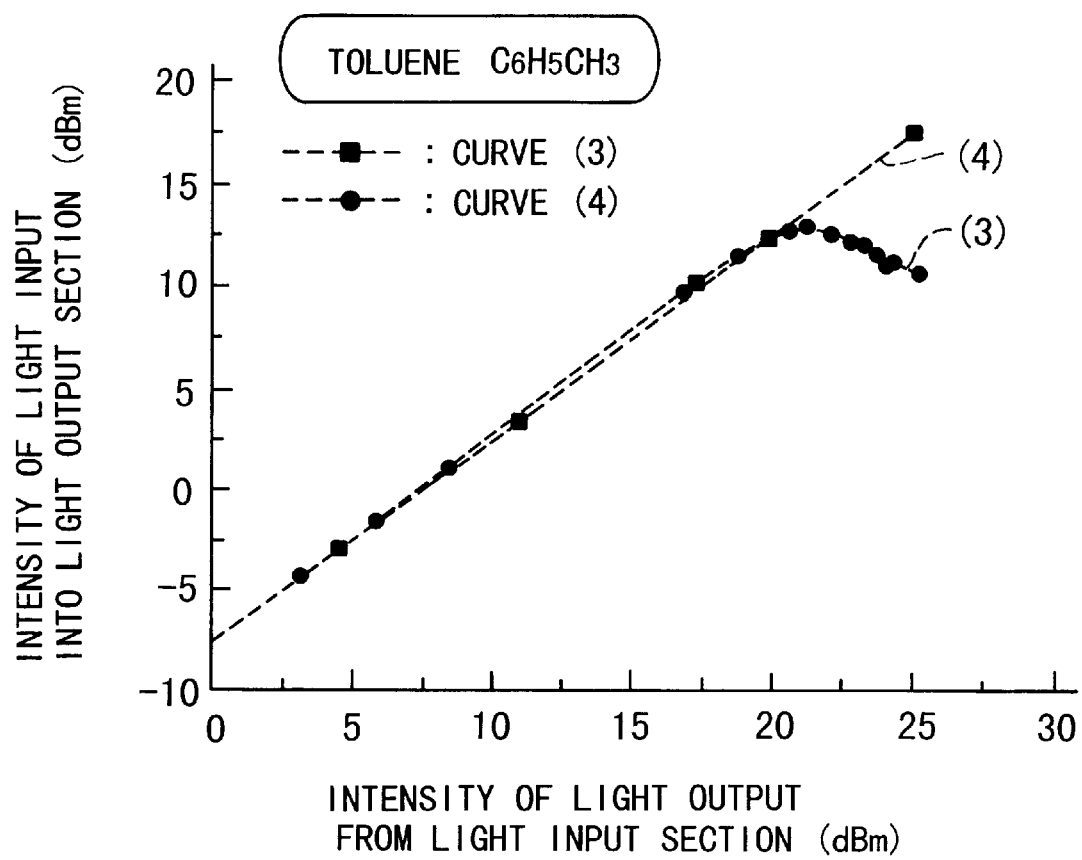
FIG. 11 is a graph diagram showing the relationship between the intensity of light output from the light input section and the intensity of light input into the light output section, obtained by using the light intensity attenuator as shown in FIG. 9 and toluene as the polar-molecule liquid.

FIG. 11 also shows experimental results relating to the light intensity attenuator as shown in FIG. 9, obtained by using toluene as the polar-molecule liquid, and inputting light having wavelength of 1.46 to 1.49 μm into the above liquid. A relationship between the intensity of light output from the light input section and the intensity of light input into the light output section, is shown in FIG. 11. Here, the following are two conditions used in this experiment:

Condition 1: The incident light is converged at focus 7 (of lens A) in the polar-molecule liquid (see curve (3) in FIG. 11).

Condition 2: The incident light is converged at focus 7 outside the polar-molecule liquid, that is, after passing through the polar-molecule liquid (see curve (4) in FIG. 11).

In both cases as shown by FIGS. 10 and 11, when the intensity of light output from the light input section 5 is lower, the intensity of the incident light is not considerably attenuated, that is, light whose intensity has been slightly attenuated in comparison with the light output from the light input section is input into the light output section 6, as shown by curves (1) and (3). In a practical system, an optical signal corresponds to this incident light.

As clearly shown by FIGS. 10 and 11, to converge the incident light in the polarmolecule liquid by using a lens increases the light-intensity density in the light-scattering device, and anomalous scattering occurs due to the thermal lens effect. Therefore, an advantage that high-intensity light in particular can be attenuated can be obtained.

Fourth Example

Figure 12:
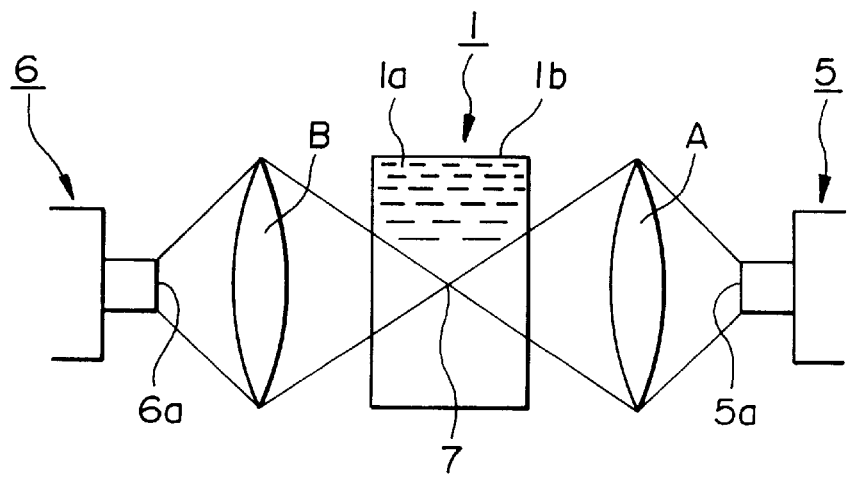
FIG. 12 is a sectional view for explaining the structure of the fourth example of the light intensity attenuator according to the second embodiment.

FIG. 12 shows the fourth example of the light intensity attenuator according to the present embodiment.

In this example, light having wavelength of 1558.5 nm is output from light output face 5a of single mode optical fiber 5 as the light input means, focus 7 of lens A exists in the polar-molecule liquid (here, toluene), and the light output from the toluene is converged via lens B on the light input face of single mode optical fiber 6 as the light output means.

Figure 13:
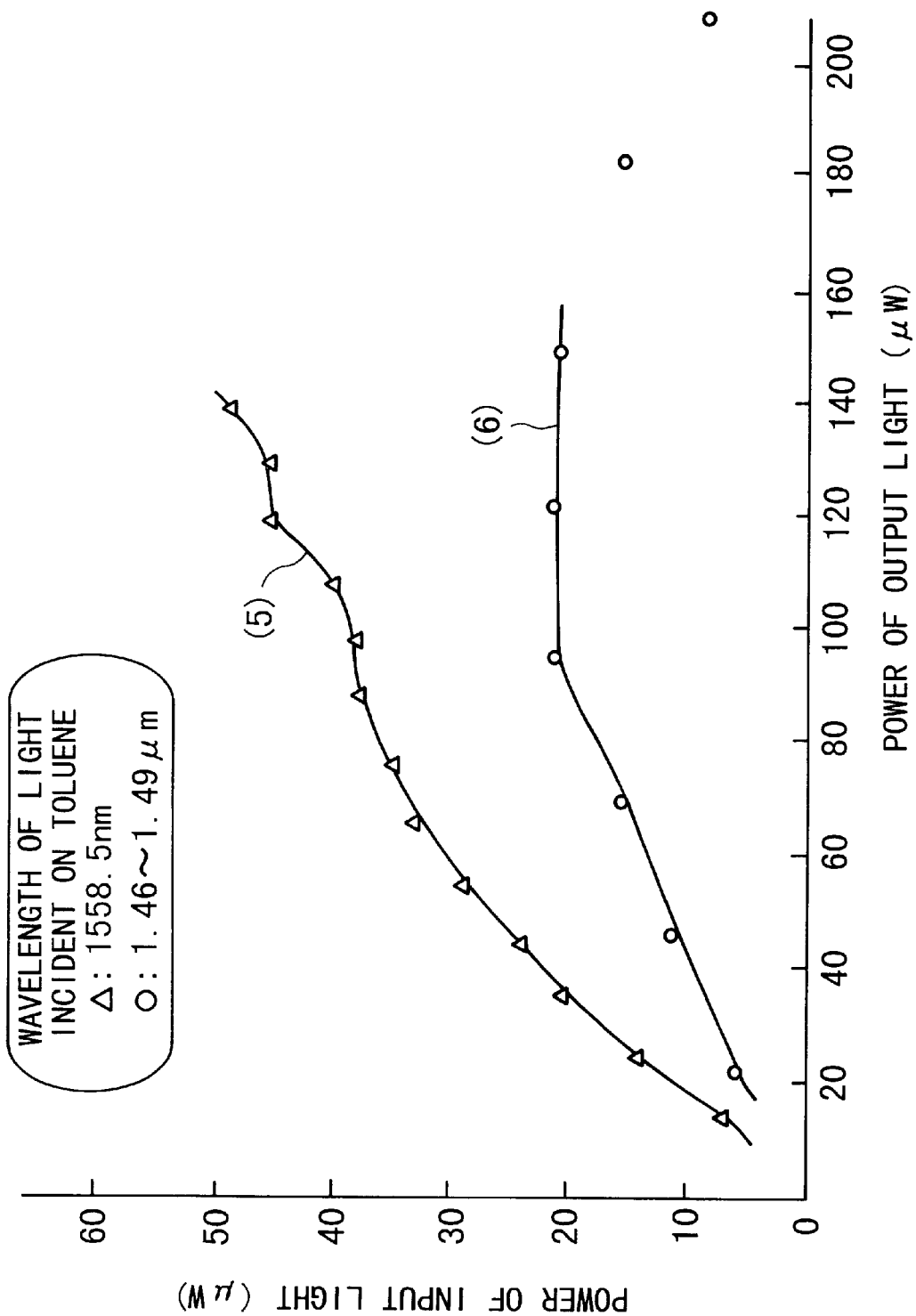
FIG. 13 is a graph diagram showing the relationship between the optical power of output light which is incident on toluene and input light which was output from the toluene, obtained by using the light intensity attenuator as shown in FIG. 12 and toluene as the polar-molecule liquid.

The curve (5) in FIG. 13 shows a relationship between the power of the output light which was output from optical fiber 5 and was incident via lens A on the toluene, and the power of the input light which was output from the toluene and is converged via lens B on the light input face of optical fiber 6.

The curve (6) shows a relationship under similar conditions, but using light (output from optical fiber 5) of wavelength of 1.46 to 1.49 $\mu$m. As clearly shown by these curves, attenuation of the intensity of the output light can be found in both cases.

In particular, using the wavelength of 1558.5 nm is generally used in optical fiber communication, and the above result indicates that the present embodiment can be applied to optical communication.

Another experiment was performed, which uses the light intensity attenuator as shown in FIG. 12, and toluene as the polar-molecule liquid. In this experiment, a laser beam of wavelength $\lambda$=1558.5 nm was incident as a target optical signal (2.488 Gbit/s) on the toluene, and the transmission characteristic was examined.

The intensity of light incident on the toluene was set at three levels:+6 dBm, +16 dBm, and +21.5 dBm, and the relationship between the intensity of light output from the toluene (that is, light which was received) and the relevant error rate was measured and determined. The obtained results are shown in FIG. 14.

This error rate is a graph parameter representing the light-receiving sensitivity of the light-receiving element, and the horizontal axis indicates the power of light input into the light-receiving element (i.e., here, light-receiving power, that is, the power of the light output from the toluene) and the vertical axis indicates the error rate (called "BER": the probability of erroneous determination of the light-receiving element with respect to 1 bit of data). If the light-receiving power is high, the error rate of the light-receiving element is small, while if the light-receiving power is small, the discriminating capability of the light-receiving element is degraded and the error rate of the light-receiving element is high. In principal, the characteristic indicates a linear relationship. Generally, the light-receiving power at "BER=$10^{-11}$" is defined as the minimum light-receiving sensitivity which is used for exhibiting a characteristic of the light-receiving element.

Figure 14:
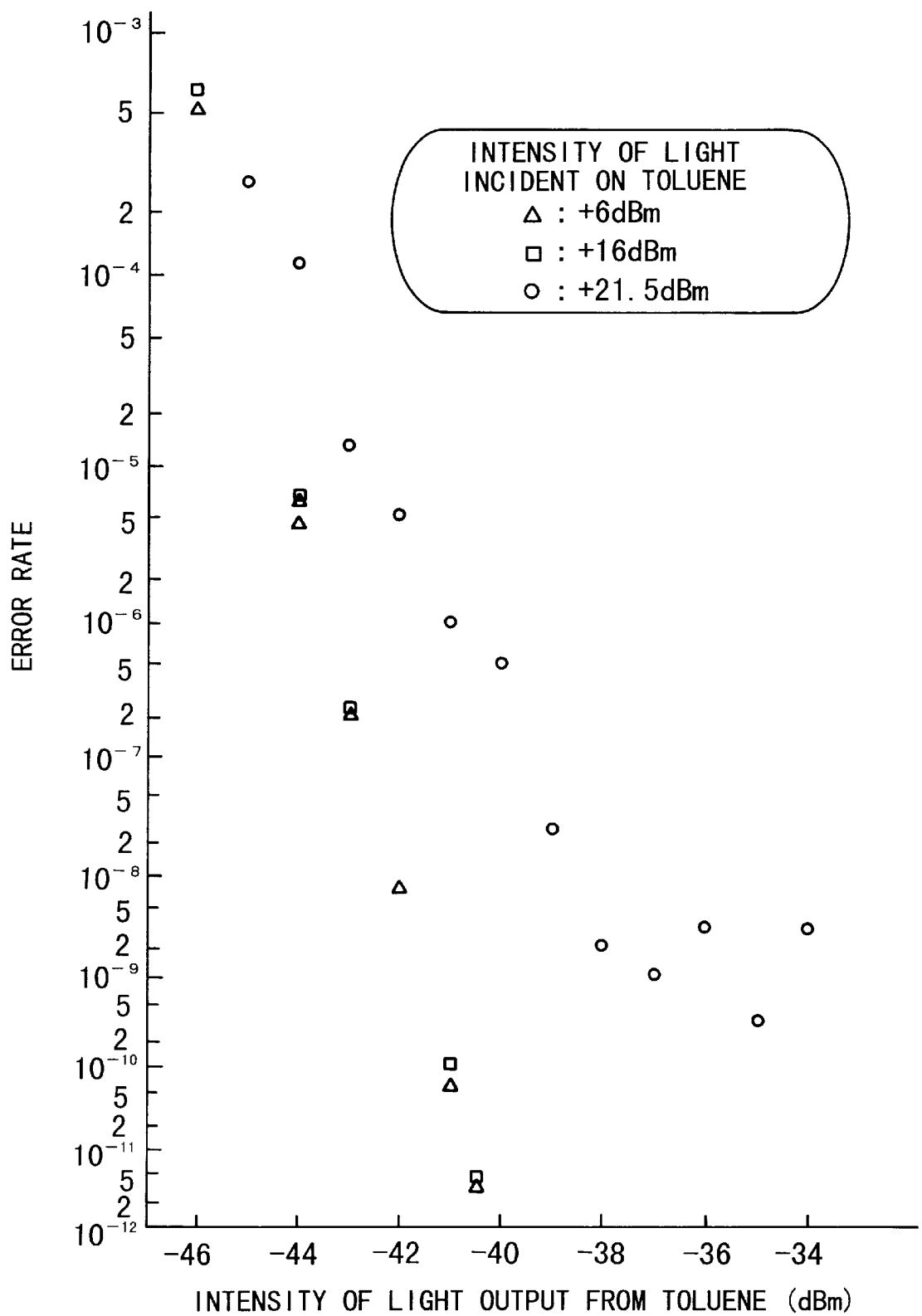
FIG. 14 is a graph diagram showing the relationship between the intensity of light output from the toluene and the relevant error rate, obtained by using the light intensity attenuator as shown in FIG. 12 and toluene as the polar-molecule liquid.

As clearly shown by FIG. 14, when the intensity of light incident on the toluene is 21.5 dBm, that is, when high-intensity light is incident on the toluene and the power-attenuating effect due to the thermal lens effect appears conspicuously, a slightly larger fluctuation of the error rate of the intensity of the received light is observed. However, with a light intensity less than 20 dBm (this is general light intensity of light incident on the polar-molecule liquid), the error rate causes no problem. That is, the light intensity attenuator according to the present embodiment does not cause trouble for the optical signal having normal light intensity in the optical fiber communication.

What is claimed is:

1. A light intensity attenuator comprising:

light input means for extracting a transmitted optical signal, said light input means comprising an optical fiber which is optically connected to an input end of an optical waveguide;

light-intensity attenuating means for receiving via the light input means the transmitted optical signal which includes a pulse-shaped surge component, and attenuating the light intensity of the surge component by a desired amount and then outputting the optical signal, wherein said light-intensity attenuating means comprises a substrate and an optical waveguide formed on the substrate, at least one of the substrate and the optical waveguide being made of a material producing a non-linear optical effect, and the refractive index of the optical waveguide with respect to the optical signal is smaller than the refractive index of the substrate with respect to a higher harmonic of the optical signal;

light output means for returning the output from the light-intensity attenuating means, wherein the light output means is an optical fiber which is optically connected to the output end of the optical waveguide; and a part of the optical signal input into the optical waveguide is wavelength converted by the non-linear optical effect into a light portion having a wavelength shorter than that of the optical signal, this wavelength-converted light portion is scattered and radiated from the optical waveguide over a neighboring area of the substrate, and the remaining portion of the optical signal is output from the output end of the optical waveguide into the output optical fiber.

2. A light intensity attenuator as claimed in claim 1, wherein the optical waveguide linearly extends from its input end toward its output end.

3. A light intensity attenuator as claimed in claim 1, wherein the optical waveguide has at least one bent portion between its input end and its output end, and the axis of input light at the input end does not align with the axis of output light at the output end.

4. A light intensity attenuator as claimed in claim 1, wherein:

the substrate is made of lithium niobate; and the optical waveguide is formed on the surface of the substrate by performing a thermal diffusion process using an element different from the material of the substrate, in accordance with a desired pattern.

5. A light intensity attenuator comprising:

light input means for extracting a transmitted optical signal;

light-intensity attenuating means for receiving via the light input means the transmitted optical signal which includes a pulse-shaped surge component, and attenuating the light intensity of the surge component by a desired amount and then outputting the optical signal, said light-intensity attenuating means comprising a light-scattering means which contains a polar-molecule liquid including polar molecules; and light output means for returning the output from the light-intensity attenuating means.

6. A light intensity attenuator as claimed in claim 5, wherein the polar-molecule liquid is at least one selected from the group consisting of water, liquid alkylbenzene, liquid aliphatic ketone, and a liquid aliphatic alcohol compound.

7. A light intensity attenuator comprising:

light input means for extracting a transmitted optical signal;

light-intensity attenuating means for receiving via the light input means the transmitted optical signal which includes a pulse-shaped surge component, and attenuating the light intensity of the surge component by a desired amount and then outputting the optical signal, said light-intensity attenuating means comprising a light scattering means which contains polar-molecule liquid including polar molecules, wherein said polar-molecule liquid is contained in a container which comprises a pair of faces which respectively face the light input means and the light output means, and at least a portion of each of these faces, which intersects with the optical path of the optical signal, is optically transparent; and light output means for returning the output from the light-intensity attenuating means.

8. A light intensity attenuator as claimed in claim 7, wherein a lens is placed between the light input means and the transparent portion of the container which faces the light input means in a manner such that the optical signal is converged at a point in the polar-molecule liquid, and at least a portion of the optical signal transmitted through the lens is converged on the light output means.

9. A light intensity attenuator as claimed in claim 8, wherein a second lens is placed between the light output means and the transparent portion of the container which faces the light output means, and at least a portion of the optical signal is converged via the second lens on the light output means.

10. A light intensity attenuator as claimed in claim 7, wherein a lens is placed between the light output means and the transparent portion of the container which faces the light output means, and at least a portion of the optical signal is converged via the lens on the light output means.

11. A light intensity attenuator comprising:

light input means for extracting a transmitted optical signal; and light-intensity attenuating means for receiving via the light input means the transmitted optical signal which includes a pulse-shaped surge component, and attenuating the light intensity of the surge component by a desired amount and then outputting the optical signal, said light-intensity attenuating means comprising a light scattering means which contains polar-molecule liquid including polar molecules wherein both the light input means and a light output means, said light output means for returning the output from the light-intensity attenuating means, have portions which respectively face the light-scattering means, and at least a part of at least one of said portions is exposed in the polar-molecule liquid contained in the light-scattering means.

12. A light intensity attenuator comprising:

light input means for extracting a transmitted optical signal; and light-intensity attenuating means for receiving via the light input means the transmitted optical signal which includes a pulse-shaped surge component, and attenuating the light intensity of the surge component by a desired amount and then outputting the optical signal, said light-intensity attenuating means comprising a light scattering means which contains polar-molecule liquid including polar molecules, wherein at least one diaphragm means for adjusting a cross-section of an optical path of the optical signal is placed at a position between the light-scattering means and a light output means, said light output means for returning the output from the light-intensity attenuating means.

13. A light intensity attenuating method which includes a light intensity attenuator, comprising the steps of:

extracting a transmitted optical signal by using a light input means;

receiving the optical signal via the light input means, and attenuating the light intensity of a pulsed-shaped surge component included in the optical signal by a desired amount by using a light-attenuating actuating means, and outputting the optical signal from the light-intensity attenuating means, wherein the light-intensity attenuating means comprises a substrate and an optical waveguide formed on the substrate, at least one of the substrate and the optical waveguide being made of a material producing a nonlinear optical effect, and the refractive index of the optical waveguide with respect to the optical signal is smaller than the refractive index of the substrate with respect to a higher harmonic of the optical signal, and the light instenity attenuating method including the steps of;

wave-length-converting a part of the input optical signal by the nonlinear optical effect into a light portion having a wavelength shorter than that of the optical signal; and scattering and radiating this wave-length-converted light portion from the optical waveguide over a neighboring area of the substrate, and outputting the remaining portion of the optical signal from an output end of the optical waveguide into an output optical fiber; and returning the optical signal output from the light-intensity attenuating means by using a light output means.

14. A light intensity attenuating method which includes a light intensity attenuator comprising the steps of:

extracting a transmitted optical signal by using a light input means;

receiving the optical signal via the light input means, and attenuating the light intensity of a pulsed-shaped surge component included in the optical signal by a desired amount by using a light-attenuating actuating means, and outputting the optical signal from the light-intensity attenuating means, said light-intensity attenuating means comprising a light-scattering means for containing a polar-molecule liquid comprising polar molecules; and returning the optical signal output from the light-intensity attenuating means by using a light output means.

* * * * *

UNITED STATES PATENT AND TRADEMARK OFFICE
CERTIFICATE OF CORRECTION

PATENT NO. : 6,134,372
DATED : October 17, 2000
INVENTOR(S) : Junichiro Ichikawa, Hirotoshi Nagata, Kaoru Higuma, Junichiro Minowa, Takaaki Ogata, Yasuhisa Taneda It is certified that error appears in the above-identified patent and that said Letters Patent is hereby corrected as shown below:

Column 17,
Line 26, delete "s o" insert -- so --
PCT Filed delete "September 20, 1998" insert -- September 29, 1998 --

Signed and Sealed this

Sixth Day of November, 2001

Attest:

*Nicholas P. Godici*

NICHOLAS P. GODICI
*Attesting Officer*   *Acting Director of the United States Patent and Trademark Office*